(12) United States Patent
Hamano

(10) Patent No.: US 9,765,242 B2
(45) Date of Patent: Sep. 19, 2017

(54) ADHESIVE FILM

(75) Inventor: Shokichi Hamano, Tokorozawa (JP)

(73) Assignee: Kyodo Giken Chemical Co., Ltd, Saitama (JP)

(*) Notice: Subject to any disclaimer, the term of this patent is extended or adjusted under 35 U.S.C. 154(b) by 1319 days.

(21) Appl. No.: 12/086,108

(22) PCT Filed: Dec. 5, 2006

(86) PCT No.: PCT/JP2006/324226
§ 371 (c)(1),
(2), (4) Date: Jun. 5, 2008

(87) PCT Pub. No.: WO2007/066640
PCT Pub. Date: Jun. 14, 2007

(65) Prior Publication Data
US 2009/0286073 A1 Nov. 19, 2009

(30) Foreign Application Priority Data
Dec. 5, 2005 (JP) .................. 2005-351127

(51) Int. Cl.
*C09J 7/00* (2006.01)
*C09J 9/02* (2006.01)
*C09J 7/02* (2006.01)

(52) U.S. Cl.
CPC ........... *C09J 9/02* (2013.01); *C09J 7/0282* (2013.01); *C09J 2201/134* (2013.01); *C09J 2479/086* (2013.01); *Y10T 428/266* (2015.01)

(58) Field of Classification Search
CPC .. C09J 7/0217; C09J 7/0207; C09J 2201/134; C09J 2479/086; C09J 9/02; C09J 7/0282; Y10T 428/266
(Continued)

(56) References Cited

U.S. PATENT DOCUMENTS

| | | | |
|---|---|---|---|
| 4,737,559 A * | 4/1988 | Kellen et al. | 526/291 |
| 4,894,259 A * | 1/1990 | Kuller | 427/208.8 |

(Continued)

FOREIGN PATENT DOCUMENTS

| | | |
|---|---|---|
| JP | 62-240373 | 10/1987 |
| JP | 2-185582 | 7/1990 |

(Continued)

OTHER PUBLICATIONS

English Machine Translation of JP2003-295769, from JPO, obtained Mar. 16, 2010.*

*Primary Examiner* — Nicholas Kokkinos
(74) *Attorney, Agent, or Firm* — Cooper Legal Group LLC

(57) ABSTRACT

An adhesive film with excellent cuttability with respect to both a base layer and a surface layer or layers laminated thereon is provided, without significant formation of adhesive burrs in various shearing processes. The adhesive film includes a support member and an adhesive layer laminated on at least one side of the support member. The adhesive layer has a laminate structure having a base layer made of a resin-based adhesive and laminated on the surface of the support member and a surface layer made of a resin-based adhesive and laminated on the base layer. The base layer is non-directional and has lengthwise and widthwise shearing strengths of 2 g to 2000 g [200 mm/min, 25 mm] in the thickness range of 2 μm to 60 μm. The base layer has a shearing strength of 1.5 to 200 times the shearing strength of the surface layer.

15 Claims, 1 Drawing Sheet

(58) Field of Classification Search
USPC .......................................... 428/354; 427/333
See application file for complete search history.

(56) References Cited

U.S. PATENT DOCUMENTS

| | | | | |
|---|---|---|---|---|
| 5,827,609 | A | * | 10/1998 | Ercillo .................. B05C 5/0254 428/354 |
| 5,917,514 | A | | 6/1999 | Higuma et al. |
| 6,063,838 | A | * | 5/2000 | Patnode et al. ................. 523/172 |
| 6,177,524 | B1 | * | 1/2001 | Ohtsuka ................. C08F 287/00 525/332.9 |
| 6,432,497 | B2 | * | 8/2002 | Bunyan ......................... 428/40.1 |
| 6,547,887 | B1 | * | 4/2003 | Ko et al. ............................ 134/6 |
| 6,803,101 | B1 | | 10/2004 | Bohm et al. |

FOREIGN PATENT DOCUMENTS

| | | |
|---|---|---|
| JP | 03-121177 | 5/1991 |
| JP | 4-1286 | 1/1992 |
| JP | 5-77435 | 3/1993 |
| JP | 5-302068 | 11/1993 |
| JP | 7-133470 | 5/1995 |
| JP | 8-283670 | 10/1996 |
| JP | 9-118861 | 5/1997 |
| JP | 09-208907 | 12/1997 |
| JP | 10-176150 | 6/1998 |
| JP | 10-296901 | 11/1998 |
| JP | 11-43656 | 2/1999 |
| JP | 11-214272 | 6/1999 |
| JP | 11-209710 | 8/1999 |
| JP | 11-274390 | 10/1999 |
| JP | 11-286662 | 10/1999 |
| JP | 2002-258753 | 9/2002 |
| JP | 2002-294185 | 10/2002 |
| JP | 2003-500513 | 1/2003 |
| JP | 2003-295769 | 10/2003 |
| JP | 2004-095461 | 3/2004 |
| JP | 2004-123769 | 4/2004 |
| JP | 2004-137457 | 5/2004 |
| JP | 2004-224857 | 8/2004 |
| JP | 2005-298579 | 10/2005 |
| JP | 2005-307124 | 11/2005 |
| JP | 2006232896 | 9/2006 |

\* cited by examiner

ADHESIVE FILM

BACKGROUND OF THE INVENTION

1. Field of the Invention

The present invention relates to an pressure-sensitive adhesive or adhesive (hereinafter simply referred to as "adhesive") film and, more particularly, to an adhesive film which is excellent in cuttability and exhibits good behavior in such shearing process as punching or perforating.

The "film" so referred to herein includes, within the meaning thereof, tape-like, sheet-like and film-like forms.

2. Description of the Related Art

In various fields such as electric and electronic devices, medical devices/appliances, livingware, buildings and cars, adhesive films have so far been used for various purposes, for example in fixing or bonding parts or members, in manufacturing flexible printed circuit boards (hereinafter referred to as "FPCs") obtainable by bonding together a copper foil and an insulating film such as a polyimide film or tapes for TAB (Tape Automated Bonding), mutually laminating rigid type printed circuit boards, fixing device elements, bonding reflective sheet or reflector aluminum/SUS sheets for liquid crystal displays, fixing casings and members via protective insulating layers, protecting cellular phone glass screens, fixing housing members and fixing car interior finishing materials.

Such adhesive films in current use include the so-called "baseless" adhesive films comprising an adhesive layer alone, and adhesive films having a base layer or sheet made of polyethylene terephthalate (PET) or a nonwoven fabric, for instance, with an adhesive-based surface layer or layers formed on one or both sides of the base (the term "pressure-sensitive adhesive" as used herein refers, among various adhesives, to an adhesive which has viscoelasticity in a solventless condition at ordinary temperature and, upon application of a pressure thereto, flows and provides a required level of bond strength; hereinafter the same shall apply).

The following document may be mentioned as related arts of the present invention:

Patent Document 1: Japanese Unexamined Patent Application Publication No. H9-208907 (Paragraphs [0002], [0003], etc)

According to the respective intended uses thereof, such adhesive films are cut to a predetermined size and form by punching or the like and, further, may be subjected to various processing such as perforating or slitting.

However, the conventional adhesive film comprising a base layer and a surface layer comprising adhesive, laminated on the base layer have various problems since the base layer and the surface layer greatly differ in physical properties.

For example, a double-faced adhesive film comprising, as the base layer, a biaxially stretched PET film excellent in dimensional stability is provided. In this constitution, however, the difference or ratio in shearing strength between the base layer and each surface layer is about 1:180 when the base layer has a thickness of 4.5 μm and the surface layer has a thickness of 25 μm; when the base layer has a thickness of 25 μm, that ratio is about 1:400.

Further, as to the elongation, a 4.5-μm-thick biaxially stretched PET film used as the base layer shows an elongation of 140%, and a 25-μm-thick surface layer shows an elongation of at least 400%; thus, the ratio between them is 1:3 or higher (cf. "Table 1").

TABLE 1

Shearing strengths and elongations of the conventional base layer (biaxially stretched PET film) and surface layer (acrylic adhesive)

| Base layer (biaxially stretched PET film) | | | Surface layer (acrylic adhesive alone) | | |
|---|---|---|---|---|---|
| Thickness (μm) | Shearing strength (g/25 mm) | Elongation (%) | Thickness (μm) | Shearing strength (g/25 mm) | Elongation (%) |
| 4.5 | 1800 | 140 | 5 | 10 or less | 400 or more |
| 12 | 2300 | 141 | 15 | 10 or less | 350 or more |
| 25 | 4000 | 142 | 25 | 10 or less | 350 or more |

Thus, the base layer, which is low in elongation percentage and is rather hard and superior in rupturability, is better processible by punching, perforating or like cutting process, whereas the adhesive constituting the surface layer is flexible and very stretchable by nature; therefore, when the adhesive film is cut, the surface layer alone is drawn then peeled off from the base and, as a result, a burr (adhesive burr) is formed by the adhesive in the surface layer, possibly causing a problem from the product quality viewpoint.

In particular, in the case of adhesive films used in products required to have high levels of precision, such as in bonding electronic elements in cellular phones or digital cameras, and subjected to fine cutting, a parting thereof may be bent, adhesive burrs may transfer to installed parts/devices, or electronic devices may rise up on adhesive burrs, and product troubles such as failure to perform the desired functions may possibly be caused thereby.

Further, the above-mentioned adhesive burrs formed by shearing of the surface layer stick to working tools such as cutting dice, drills or slitters of shearing devices, causing troubles in the subsequent steps on the occasion of continuous shear processing, possibly leading to interruption of the production line. In the case of punching or press processing, for instance, high-precision inspections for transfer of adhesive burrs to processed products and for successful cutting out of adhesive films are required and, further, processes to remove adhesive burrs adhering to cutters and other working tools are required about every 40,000 shots, whereby the production process becomes complicated.

On the other hand, in the case of the conventional baseless adhesive films, the adhesive is sticky and stretchable by nature and, therefore, the formation of such adhesive burrs as mentioned above is unavoidable and, in addition, the adhesive burrs formed themselves have the function of adhesives, so that they readily get larger and cause further troubles. To overcome these problems, such measures are known as selection of increasing the molecular weight of the adhesive at a level of 1,000,000 to 8,000,000 or more and employment of a highly crosslinked formulation; however, these measures may readily cause decreases in tackiness and the adhesive properties at ordinary temperature may be sacrificed, and the glass transition point (Tg) is also increased and the adhesive properties at low temperature may be readily sacrificed.

The reason why the conventional adhesive films constituted of a biaxially stretched PET film base layer and an adhesive layer or layers thereon allow the formation of adhesive burrs upon such shearing process as punching or perforating is the occurrence of an interface between the base layer and the surface layer-constituting adhesive which differ in elongation percentage as a result of different compositions thereof, among others. In many cases, adhesive burrs are presumably formed as a result of peeling off of the surface layer comprising adhesive from the base as caused by failure of that interface.

Based on these premises, the inventors paid attention to the fact that the formation of adhesive burrs in the steps of slit formation and cutting is caused by the phenomenon of adhesion of low-molecular-weight uncrosslinked components intrinsic in adhesives and by failure of the adhesive components to stretch and, for solving such problems, not only the elongation percentages in the lengthwise and widthwise directions but also the elongation percentage in the direction of thickness is an important factor; and, they found that when the elongation percentage of the surface layer is put closer to that of the base layer by providing the interface between the surface layer and base layer with a proximity or gradient in elongation percentage, a proximity or gradient in molecular weight and/or a proximity or gradient in degree of crosslinking, either singly or in combination (including all) or by combining the base layer and surface layer or layers so that one or a plurality (including all) of such proximity or gradient features may be attained, it becomes possible to equilibrate the elongation percentages in the XYZ [lengthwise, widthwise and thickness] directions and thereby obtain the desired performance characteristics, without sacrificing the adhesive power.

It is an object of the present invention, which has been completed based on such findings as mentioned above, to provide an adhesive film which has good cuttability with respect to both the base layer and the surface layer or layers laminated thereon, hardly allows the formation of adhesive burrs in various shearing processes such as punching, perforating and slitting, is excellent in workability and is suited for use in continuous processing and, even in the case of a double-faced adhesive film with a thickness of 200 μm or less, for instance, can satisfactorily undergo such processing as the above-mentioned punching or perforating.

In the following explanation of the Summary, reference numerals are referred as of the Embodiment in order to easily read the present invention, however, these numerals are not intended to restrict the invention as of the Embodiment.

SUMMARY OF THE INVENTION

An adhesive film 1 according to the present invention is characterized by being produced by laminating a non-directional base layer 11 comprising resin and having lengthwise and widthwise shearing strengths of 2 g to 2000 g [200 mm/minute, width 25 mm], preferably 5 g to 1000 g, more preferably 10 g to 500 g, in the thickness range of 2 to 60 μm with a surface layer 12 comprising of resin-based adhesive.

In the adhesive film 1 having the above constitution, the base layer 11 preferably has a shearing strength of 1.5 to 200 times the shearing strength of the surface layer 12.

It is preferred that the surface layer 12 have a gel fraction of 0% to 80%, the base layer 11 have a gel fraction of 30% to 100% and the ratio in gel fraction between the base layer 11 and the surface layer 12 is 80 or less relative to 100 of the base layer.

The term of "gel fraction" referred to herein is the percentage of the solid matter obtained by immersing the base layer or surface layer in toluene to cause the same to swell, filtering the same through a 200-mesh wire gauze and drying the residual fraction at 110° C. for 1 hour and can be calculated using the following formula:

Gel fraction (%)=toluene solution for swelling an adhesive resin/weight of residual solution after filtration×100   (Formula)

Further, the surface layer in the adhesive film 1 having the above constitution preferably has a glass transition point (Tg) of −80° C. to 5° C., more preferably −40° C. to −10° C. from the low-temperature adhesiveness viewpoint, while the base layer preferably has a glass transition point (Tg) of 0° C. to 260° C., more preferably 5° C. to 60° C. from the flexibility provision viewpoint.

In the adhesive film 1 having the above constitution, the surface layer 12 may be formed either on one side of the base layer 11 or on both sides thereof.

Another adhesive film 1' according to the present invention is characterized in that it has a laminate structure comprising a support member 20, for example a polyimide film, and an adhesive layer or layers 10 laminated on one or both sides of the support member 20 and each adhesive layer 10 comprises a base layer or sheet 11 made of a resin-based adhesive and laminated on the surface of the support member 20 and a surface layer 12 made of a resin-based adhesive and laminated on the base layer or sheet 11, wherein the base layer or sheet is non-directional and has lengthwise and widthwise shearing strengths of 2 g to 2000 g [200 mm/min, width 25 mm] in the thickness range of 2 μm to 60 μm.

In the adhesive film 1' comprising the above-mentioned support member 20, the adhesive layer 10 may be provided either on one side or on both sides of the support member 20.

The adhesive films 1, 1' according to the present invention preferably have a gradient resulting from chemical equilibrium-due crosslinking in the interface between the base layer 11 and the surface layer 12.

More specifically, 20% to 100% of the respective constituents of the base layer 11 and the surface layer 12 are preferably constituted of the same monomer or polymer compositions except for the differences in molecular weight and in intermolecular crosslinking agent species, more preferably, the resin constituting the base layer 11 is higher in molecular weight than the resin constituting the surface layer 12 and/or the resin constituting the base layer 11 is preferably higher in degree of crosslinking as compared with the resin constituting the surface layer 12.

The surface layer 12 preferably has a thickness of 0.1 μm to 50 μm and the base layer 11 preferably has a thickness of 2 μm to 60 μm.

In the adhesive film 1, 1' having the surface layer 12 on both sides thereof, one of the surface layers 12 and the other of the surface layers 12 may be formed of adhesive differing in properties or of adhesives differing in adhesive power.

The elongation percentage of the surface layer 12 may be 200% or more, and the elongation percentage of the base layer 11 may be 300% or less, preferably 200% or less.

In the adhesive film 1' comprising the support member 20, the support member 20 is preferably made of a film made of imide resin, such as polyimide.

BRIEF DESCRIPTION OF DRAWINGS

The objects and advantages of the invention will become apparent from the following detailed description of preferred embodiments thereof provided in connection with the accompanying drawings in which.

DETAILED DESCRIPTION OF THE PREFERRED EMBODIMENT

In the following, embodiments of the invention will be described with reference to the attached drawings.

1. Embodiment 1

The adhesive film 1 according to the first aspect of the invention has a laminate structure comprising a surface layer 12 serving as an adhering face against an adherend and formed of a resin-based adhesive and a base layer 11 constituting a base layer. An example of such constitution is shown in FIG. 1.

Figure 1:
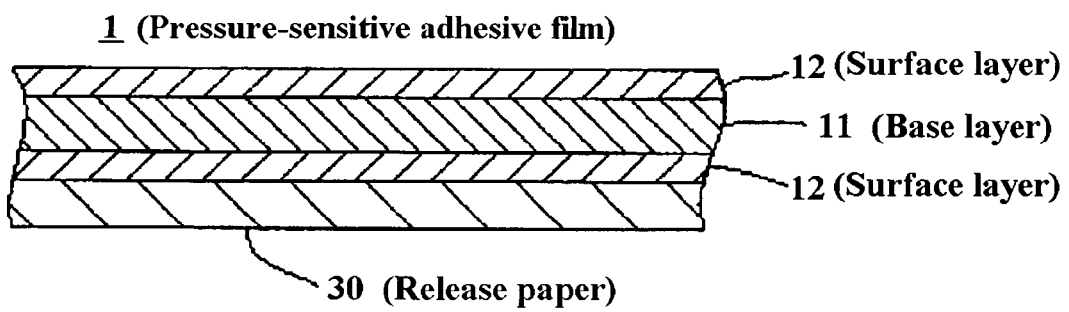
FIG. 1 shows a schematic representation of an adhesive film according to the present invention.

In the embodiment shown in FIG. 1, there is shown an example which is constituted as a double-faced adhesive film with a surface layer 12 formed on each of the side of the base layer 11. However, the constitution of the adhesive film according to the present invention is not limited to the constitution shown in the figure but may be, for example, such that the surface layer 12 is formed only on one side of the base layer 11.

In the example shown in FIG. 1, a double-faced release paper 30 is attached to one (on the bottom side in the figure) of the surface layers 12, so that when the adhesive film 1 is rolled up with the release paper 30 coming on the outer circumference side, the adhesive film 1 can be provided in a rolled-up form.

The release paper 30 to be used here may be a paper sheet anchor-coated with a resin, or a highly releasable resin sheet made of a polyester, polyethylene or polypropylene, for instance, and, if required, one the surfaces of which are coated with a release agent such as a silicone material may also be used.

[Base Layer]

The above-mentioned base layer 11, one of the constituent of the adhesive film 1 according to the present invention, can be produced from a resin selected from among those conventional resins which have good cuttability. More specifically, those resins for constituting pressure-sensitive adhesives or adhesives as well as various known resins generally capable of being used as base materials for adhesive films can be used provided that they are resins having lengthwise and widthwise shearing strengths of 2 g to 2000 g [200 mm/min, width 25 mm] in the thickness range of 2 μm to 60 μm. They are molded into non-directional films or the like for the use thereof.

For example, there may be mentioned the following ones as resins capable of being used as the base layer 11 mentioned above.

TABLE 2

| Base layer | |
|---|---|
| Natural rubber | |
| Synthetic rubber | Styrene-Butadiene type, Polyisobutylene type, Isoprene type, etc. |
| Acrylic resins | Polymers of 2-Ethylhexyl Acrylate, Butyl Acrylate, Ethyl Acrylate, etc. |
| Olefin resins | Polystyrene-Ethylene/Butylene Copolymers, Polyethylene, Polystyrene-Ethylene-Propylene Copolymers, etc. |
| Silicone resins | Vinylpolydimethylsiloxane Copolymers, Vinyltrichlorosilane-Alkoxysilane Copolymers, etc. |
| Urethane resins | Products obtained by reaction of Polyisocyanates and Polyols (Polyester Polyols, Polyester Polyol-Polylactone Polyols, etc.), etc. |
| Polyester resins | |
| Saturated polyesters | |
| Unsaturated polyesters | |

The base layer 11 can be formed preferably of an acrylic resin, or an acrylic-modified epoxy resin, and/or a saturated polyester resin.

Usable as the acrylic resin are, for example, resins obtained by polymerization, in the manner of solution polymerization, bulk emulsion polymerization or suspension polymerization, for instance, of one or more of the monomers enumerated below. Usable as the monomers are acrylic acid, methacrylic acid, alkyl acrylates and methacrylate alkyl ester and the alkyl group of which is substituted or unsubstituted and contains 1 to 20 carbon atoms (e.g. methyl acrylate, ethyl acrylate, butyl acrylate, 2-ethylhexyl acrylate, isononyl acrylate, methyl methacrylate, hydroxyethyl methacrylate, hydroxypropyl methacrylate, dimethylaminoethyl methacrylate), vinyl acetate, acrylonitrile, acrylamide, styrene, vinylidene chloride, itaconic acid, acrylamide, methylolacrylamide, glycidyl methacrylate, maleic anhydride or the like.

The base layer 11 can also be formed of an epoxy type resin. Thus, phenol novolak type, bisphenol A-based, bisphenol F-based, cresol novolak type and like ones can be used. When an acrylic adhesive is used as the adhesive surface layer 12 to be described later herein, the base layer 11 is preferably formed of an acrylic-modified epoxy resin which has affinity for that acrylic adhesive and further has flexibility.

Usable as the saturated polyester type resin are polyethylene terephthalate (PET), polybutylene terephthalate (PBT), poly-1,4-cyclohexyldimethylene terephthalate (PCT), polyethylene naphthalate (PEN), or the like.

The results of shearing strength and elongation percentage measurements of base layers obtained by using various resins, namely acrylic, acrylic-modified epoxy and saturated polyester resins, are, for example, as shown below in Table 3.

TABLE 3

Shearing strength and elongation percentage for various base layers
Base layers to be used in the present application (Examples)

| | Items | | | | | |
|---|---|---|---|---|---|---|
| | Acrylic films | | Acrylic-modified epoxy films | | Saturated polyester films | |
| Thickness | Shearing Strength g/25 mm | Elongation % | Shearing strength g/25 mm | Elongation % | Shearing strength g/25 mm | Elongation % |
| 5μ | 130 | 190 | 10 | 110 | 380 | 150 |
| 10μ | 180 | 230 | 10 | 105 | 980 | 160 |
| 15μ | 500 | 200 | 35 | 130 | 1450 | 160 |
| 20μ | 520 | 144 | 115 | 132 | 2450 | 163 |
| 25μ | 520 | 130 | 138 | 133 | 2550 | 164 |

Comparative Examples

| | Items | | | |
|---|---|---|---|---|
| | Biaxially stretched PET films (conventional bases) | | adhesive alone | |
| Thickness | Shearing strength g/25 mm | Elongation % | Shearing strength g/25 mm | Elongation % |
| 5μ | 1800 (4.5μ) | 140 | 10 or less | 300 or more |
| 10μ | | | 10 or less | 300 or more |
| 15μ | 2300 (12μ) | 141 | 10 or less | 300 or more |
| 20μ | | | 10 or less | 300 or more |
| 25μ | 4000 (25μ) | 142 | 10 or less | 300 or more |

In the "Table 3",
(1) Shearing strength was measured on a tensile tester at 200 mm/min;
(2) The "acrylic films" were obtained from an acrylic block polymer type resin by the coating emulsion casting method;
(3) The "acrylic-modified epoxy films" were obtained from a modified acrylic/epoxy crosslinked type resin by the coating solvent casting method;
(4) The "saturated polyester films" were obtained from a saturated polyester type resin by the coating solvent casting method;
(5) The "biaxially stretched PET films" used were about 5-times biaxially stretched commercial polyester films having a thickness of 4.5 μm, 12 μm or 25 μm; and
(6) The "adhesive alone" meant an acrylic adhesive agent.

In this embodiment, a resin comprising, as main components, the above-mentioned acrylic acid in a proportion of 20% or more and, in addition, resin including vinyl acetate is used as the base layer 11.

The material constituting the base layer is preferably a nonolefinic thermosetting type one having weathering resistance, preferably an acrylic type one.

As for the characteristics of the base layer, the wettability index is preferably 40 dynes or more, the affinity for the adhesive is preferably 43 dynes or more, and the adhesive strength at ordinary temperature is preferably 1000 g [300 mm/min/25 mm width; JIS Z 0237] or less and, after decreases in elongation percentage, 500 g or less, more preferably 300 g or less and it may be 0 g. Further, a base layer showing an adhesive strength after application by heating at 100° C. or more of 100 g or more, preferably 500 g or more, more preferably 1 kg or more, is preferably used.

The Young's modulus of the base layer 11 is, for example, 300% or less, preferably 200% or less, more preferably 120% to 180%. The "Young's modulus" so referred to herein is the "elongation" as defined in JIS Z 0237-1991.

The crosslinking of the resin constituting the base layer 11 is carried out by incorporating an appropriate crosslinking agent on the occasion of polymerization. The crosslinking agent that can be added is, for example, an epoxy resin, an isocyanate, a melamine resin, a urea resin, an etherified amino resin or a metal chelate.

The thickness of the base layer 11 is 2 μm to 60 μm, preferably 5 μm to 30 μm, although it may vary according to the intended use, the material used and the material employed as the surface layer 12 as described later.

The base layer 11 can be formed from a raw material prepared by polymerization, in the manner of solution polymerization, bulk polymerization, emulsion polymerization or suspension polymerization, of one or more starting monomers or polymers, optionally together with an additive or additives incorporated therein, by using the coater drying method, T die method, inflation method or the like, or by casting method using said raw material.

The base layer 11 may contain one or more of such additives as antioxidants, heat transfer agents, thermal shrinkage inhibitors, flame retardants and electrically conducting materials.

The electrically conducting materials are nickel, zinc oxide, tin oxide, conductive carbon and like materials to be dispersed in the base layer 11 to provide the same with electrical conductivity, and the conductive materials to be used in this embodiment preferably have a particle diameter of 0.01 μm to 30 μm, more preferably 1 μm to 0.02 μm.

The amount of addition of the conductive materials is preferably 20% to 40% by weight relative to the amount of the resin in the base layer 11.

[Surface Layer]

Usable as the resin constituting the surface layer 12 laminated on one side or each of the side of the above base layer 11 are those resins which show viscoelasticity at room temperature and, upon application under pressure to adherends, flow and exhibit adhesive properties, namely those various known resins which can generally be used as "adhesives".

The resin (adhesive) to be used in forming the surface layer 12 can be suitably selected from various known adhesives, for example the adhesives based on the resins listed below.

TABLE 4

| Surface layer | |
|---|---|
| Natural rubber | |
| Synthetic rubber | Styrene-Butadiene type, Polyisobutylene type, Isoprene type, etc. |
| Acrylic resins | Methyl(meth)acrylate, Ethyl(methyl)acrylate, Butyl(meth)acrylate, 2-Ethylhexyl(meth)acrylate, etc. |
| Olefin resins | Polyethylene, Polypropylene, etc. |
| Silicone resins | Siloxane-Trichlorosilane, Alkoxysilanes, etc. |
| Urethane resins | Polyester Polyol-, Polycarbonate-, Polyether Polyol- and Polyalkylene Polyol-based ones, etc. |

The surface layer 12 preferably comprises the same main component as in the above-mentioned base layer 11 and, in this embodiment, a resin containing acrylic acid in a proportion of 30% or higher is used in forming the surface layer 12.

In cases where the surface layer 12 is made of an acrylic resin, use can be made, as this acrylic resin, of a product obtained by polymerization, in the manner of solution polymerization, bulk polymerization, emulsion polymerization or suspension polymerization, of one or more of those monomers enumerated above likewise referring to the acrylic resins for the base layer 11.

When it is applied only to one side of the base layer 11, the surface layer 12 preferably has a thickness of 1 μm to 150 μm, more preferably 3 μm to 50 μm, still more preferably 5 μm to 25 μm and, when the surface layer 12 is applied to each of the side of the base layer 11, surface layers having respective thicknesses within the range mentioned above are formed on each of the side of the base layer 11.

The resin constituting the surface layer or layers 12 may contain, if desired, one or more of such additives as tackifiers, softening agents, fillers, antioxidants and crosslinking agents, and, among them, the following may be mentioned as the tackifiers.

The crosslinking agents to be added as the above-mentioned additives can be selected for use among the additives enumerated above referring to the additives to be added to the base layer 11.

Furthermore, in cases where the surface layer 12 is required to be electrically conductive, any of the same conductive materials as described above referring to the base layer 11 can be added, and the particle diameter and level of addition of the conductive material to be added are the same as described above referring to the base layer 11.

[Combination Conditions of Base Layer/Surface Layer]

The adhesive film 1 according to the present invention is obtained by laminating the base layer made of one or more of the various resin materials mentioned above with an adhesive and an adhesive respectively based on any of the various resin materials mentioned above referring to the surface layer 12 and, in laminating the base layer 11 with the surface layer 12, the surface layer 12 may be formed on one side of the base layer 11, or the surface layers 12 may be formed on each of the side of the base layer 11 to constitute a double-faced adhesive film.

In the conventional adhesive films obtained by laminating a surface layer formed of adhesive on a base layer, adhesive burrs are formed upon such shearing process as punching or perforating due to the adhesive properties intrinsic in the surface layer-constituting adhesive.

Thus, the shearing strength of the adhesive constituting the surface layer 12 is generally 10 g/25 mm or less, irrespective of surface layer thickness, namely very small as compared with the shearing strength of the base layer (cf. Table 1) and, as compared with the base layer which is low in elongation percentage, rather rigid and excellent in rupturability and can well undergo cutting such as punching or perforating, the surface layer constituted of an adhesive, which is flexible and markedly rich in stretchability, is

TABLE 5

| Tackifiers | |
|---|---|
| Rosin type ones | Rosin, Gum cord rosin, Modified rosin, Rosin esters, etc. |
| Terpene phenol resins | |
| Terpene resins | |
| Synthetic petroleum resins | Isoprene/cyclopentadiene/1,3-pentadiene/1-pentene copolymers, 2-pentene/dicyclopentadiene copolymers, 1,3-pentadiene-based resins, indene/styrene/methylindene/α-methylstyrene copolymers, etc. |
| Phenol resins | |
| Xylene resins | |
| Alicyclic petroleum resins | |
| Coumarone-indene resins | |
| Styrenic resins | |
| Cyclopentadiene resins | | drawn and partly peeled off from the base material on the occasion of cutting, whereby burr formation is caused.

The biaxially stretched PET films so far used as base layers in the conventional adhesive films, in which molecules are oriented in the lengthwise and widthwise directions of the films, presumably show molecular orientation-depending unstable rupturing behaviors in oblique directions and in the thickness direction, hence are incompatible with the non-directional surface layers and thus allow the formation of a number of adhesive burrs.

Therefore, paying attention to the above situation, the present inventors have employed a resin exhibiting lengthwise and widthwise shearing strengths of 2 g to 2000 g [200 mm/min, width 25 mm] within the thickness range of 2 μm to 60 μm as the resin for constituting the base layer; by laminating an non-directional base layer formed of such resin with a surface layer of a resin-based adhesive to thereby narrow down the difference in shearing strength between the base layer and surface layer, it becomes possible to inhibit the surface layers from being peeled off on the occasion of such shearing process such as cutting.

For preventing such peeling of the surface layers as mentioned above, it is effective to render the shearing strength of the base layer closer to the shearing strength of the surface layers or equal to the shearing strength of the surface layers; and the resin constituting the base layer more preferably has a shearing strength of 5 g to 1000 g within the thickness range of 2 μm to 60 μm and, in this embodiment, a resin having a shearing strength of 10 g to 500 g (200 mm/min, width 25 mm) has been used.

Further, for preventing such peeling of the surface layers as mentioned above, it is effective to narrow the difference in composition, among others, between the base layer and the adhesive layer constituting the surface layer, and render the interface phase occurring between both layers as closer as possible so that such a function as intermolecular crosslinking may be performed in the interface between the surface layers and the base layer.

Therefore, in this embodiment, not only the base layer is restricted to an non-directional one having shearing strength values within the range mentioned above but also 20% to 100% of the respective constituents of the base layer 11 and surface layer 12 are constituted of a monomer or polymer having the same composition except for the difference in molecular weight and/or the difference in crosslinking agent species added to thereby make the compositions of the resin constituting the base layer and composition of the resin constituting the surface layer close to each other so that any distinct interface between the base layer 11 and surface layer 12 in the adhesive film 1 may disappear and a constitution capable of properly preventing peeling, among others, may be provided. By making the compositions of the base layer 11 and surface layer 12 similar to each other in that manner, it becomes possible to cause crosslinking due to chemical equilibrium in the interface between both layers and thereby render the interface indistinct.

Thus, in the adhesive films 1, 1' according to the present invention, the surface layer 12 is constituted of a resin relatively low in molecular weight or in degree of crosslinking so that the layer may exhibit adhesive properties, whereas the base layer 11 is constituted of a resin relatively high in degree of crosslinking or in molecular weight so that the adhesive film may be provided with shape retention ability and strength, among others, and the fact that the constituents are common wholly or partly, as mentioned above, induces a phenomenon of equilibration of the non-crosslinked molecules in the crosslinking agent in the interface region owing to the use of the crosslinking agent such as an epoxy or isocyanate type one in the base layer 11 in addition to covalent bonding among functional groups of the components in the surface layer 12 and base layer 11 and, further, low-molecular-weight molecules in the adhesive layer are partly absorbed by the polymer skeletons in the base layer and the interface of the high molecular weight layer is equilibrated to some extent, possibly resulting in appearance of gradients in degree of crosslinking and in molecular composition in the region between the two layers and in being close to each other, disappearance or obscuring of the interface between the surface layer and base layer.

Further, according to the gradients mentioned above, the adhesive film of the present invention is rich in stress-absorbing ability and following capacity to the adherend and, as a result, the adhesive performance characteristics are also improved.

It is thus preferred that both the base layer 11 and surface layer 12 be formed of monomers or polymers having the constituents which are wholly or partly identical in composition and, at the same time, the resin constituting the base layer 11 be higher in molecular weight as compared with the resin constituting the surface layer 12. More preferably, a resin higher in degree of crosslinking as compared with the resin constituting the surface layer 12 is used as the resin constituting the base layer 11.

If a preferred range of such intermolecular crosslinking in the surface layer and base layer is defined in terms of "gel fraction", the surface layer preferably has a gel fraction of 0% to 80% and the base layer preferably has a gel fraction of 30% to 100%, with the ratio in gel fraction between the base layer and surface layer being preferably 80 or lower (surface layer)/100 (base layer).

The "gel fraction" so referred to herein is the percentage of the solid matter obtained by immersing the base layer or surface layer in toluene to cause the same to swell, filtering the same through a 200-mesh wire gauze and drying the residual fraction at 110° C. for 1 hour and can be calculated using the following formula:

Gel fraction (%)=toluene solution for swelling an adhesive resin/weight of residual solution after filtration×100   (Formula)

The molecular weight of the resin to be used in the base layer 11 is, for example, 200,000 to 5,000,000, preferably 300,000 to 3,000,000, in particular 500,000 to 1,000,000.

The base layer 11 and surface layer 12 are preferably close in molecular weight, degree of crosslinking, elongation percentage and other composition features to each other, in particular in the lamination interface between both layers. Therefore, the base layer 11 and/or surface layer 12 may be constituted of a plurality of layers differing stepwise in molecular weight, degree of crosslinking, elongation percentage and compounding formulation to give gradients in molecular weight, degree of crosslinking, elongation percentage and compounding formulation in the direction of thickness and thereby approximates molecular weight, degree of crosslinking and compounding formulation in the vicinity of the lamination interface.

In cases where the surface layers 12 are formed on each of the side of the base layer 11 to give a double-faced adhesive film, different resin materials may be selected respectively for the surface layer 12 to be formed on one side of the base layer 11 and the surface layer 12 to be formed on the other side so that both layers may vary in adhesive properties.

The adhesive films 1, 1' according to the present invention may be constituted, for example, of a combination of a base layer 11 made of a thermosetting resin-based adhesive and a surface layer 12 made of a resin-based adhesive.

To attain a balance between the wettability of adherends at room temperature and the cohesive force, it is preferred that the surface layer 12 shows an elongation percentage of 20 to 500%, preferably 100% to 300%, more preferably, a lower limit thereto is at least 200%.

The base layer 11 preferably shows an elongation percentage of 300% or lower. From the viewpoint of affinity for the surface layer, the percentage is preferably 0% to 300% and, from the viewpoint of toughness strength, dimensional stability and burr formation prevention, the percentage is preferably 0% to 150%; further, from the viewpoint of workability in punching and improvement and stabilization of the adhesive power, 20% to 80% is suitable.

In the finished state of the adhesive films 1, 1', the base layer 11 and surface layer 12 preferably show an elongation percentage of 0% to 300%, preferably 0% to 150% from the viewpoint of the burr formation prevention and punching workability, still more preferably 20% to 100%.

It is preferred, from the viewpoint of affinity and stress relaxation in the interface between both layers, that the resin of the base layer 11 and the resin of the surface layer 12 are mutually close in elongation percentage. On the other hand, there are a number of difficulties in satisfying the other performance requirements to be met by the base layer 11 and surface layer 12. Namely, the base layer is required to have such performance characteristics as dimensional stability and retentivity, which require rigidity and an elongation percentage close to 0%. On the other hand, the surface layers are required to have cold wetting ability and fluidity, hence a greatly different elongation percentage value of 300% or higher as a general characteristic. In the art, it is difficult for both layers to satisfy by themselves all the performance requirements mentioned above, however, by using an non-directional base material having specific shearing strength features as defined herein, and further preferably by laminating the base layer 11 and surface layer 12 respectively made of resins similar in composition, it becomes possible to attain the required performance characteristics.

2. Embodiment 2

Figure 2:
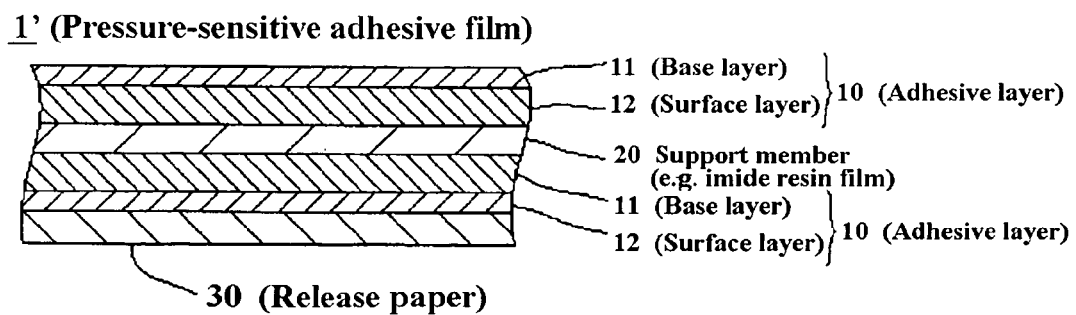
FIG. 2 shows a schematic representation of another adhesive film according to the present invention.

Another adhesive film 1' according to the present invention is shown in FIG. 2.

This adhesive film 1' is obtained by laminating an imide resin-based film support member 20, for example a polyimide film used as an insulating film in the FPCs mentioned above, with adhesive layers 10 to give the adhesive film 1'.

In the adhesive film 1' according to this embodiment 2, each adhesive layer 10 has a laminate constitution corresponding to the adhesive film 1 illustrated hereinabove referring to the embodiment 1; thus, each adhesive layer 10 comprises a base layer 11 laminated on the surface of the imide resin-based film support 20 and a surface layer 12 formed on this base layer 11.

In the embodiment as shown, the adhesive layer 10 is formed on each of the side of the imide resin-based film support 20 to give an adhesive double coated tape; it is also possible, however, to form this adhesive layer 10 only on one side of the imide resin-based film support 20.

In the example shown in FIG. 2, a double-faced release paper 30 is applied to one of the adhesive layers 10, and the situation such that when the adhesive film 1' is rolled up, with the release paper 30 coming on the outer circumference side, the adhesive film 1' can be provided in a rolled-up form is the same as in the case of the adhesive film 1 according to the embodiment 1 described hereinabove.

Further, as for the release paper 30 to be used herein, the same one as those described hereinabove referring to the embodiment 1 can be used.

In this way, the adhesive film 1' resulting from lamination of the imide resin-based film support 20 with the adhesive layers 10 can be readily used for the manufacture of FPCs, reinforcing sheet for FPCs, TAB tapes and the like by applying a copper foil or the like thereto.

The double-faced adhesive film 1' with the adhesive layer 10 being formed on each of the side of the imide resin-based film support 20 can be used in those cases where FPCs or the like are produced by applying a copper foil or the like to one side thereof and then two or more FPCs are mutually bonded together via the adhesive layer 10 formed on the other side to give a laminate, for instance.

EXAMPLES

1. Test Example 1 (Test for Measuring Shearing Strength and Elongation Percentage of Adhesive Films)

[Test Methods]

Using each film shown in Table 3 as the base layer, an adhesive film was produced by applying, to each side thereof, an acrylic adhesive to a total solid matter thickness of 10 μm (5 μm each on the front and rear sides). Each of the thus-produced adhesive films was measured for shearing strength and elongation percentage. The results obtained are shown in Table 6.

Each of the films used as the base layer had a thickness of 5 μm except for the biaxially stretched PET film used in Comparative Example which was a commercial product having a thickness of 4.5 μm.

TABLE 6

Results of measurement for shearing strength
and elongation percentage of adhesive films

|  | Example 1 | Example 2 |
|---|---|---|
| Base layer | Acrylic type (5-μm-thick) | Acrylic-modified epoxy type (5-μm-thick) |
| Surface layers | Acrylic (5 μm on each side) | Acrylic (5 μm on each side) |
| Shearing strength (g/25 mm) | 175 | 120 |
| Elongation (%) | 220 | 108 |

TABLE 6-continued

Results of measurement for shearing strength
and elongation percentage of adhesive films

|  | Example 3 | Comparative Example |
|---|---|---|
| Base layer | Saturated polyester type (5-μm-thick) | Biaxially stretched PET film (4.5-μm-thick) |
| Surface layers | Acrylic (5 μm on each side) | Acrylic (5 μm on each side) |
| Shearing strength (g/25 mm) | 320 | 360 |
| Elongation (%) | 138 | 146 |

[Test Results and Consideration Therefor]
(1) Example 1

As shown in Table 6, the adhesive film of Example 1 comprising an acrylic resin film as the base layer showed a shearing strength of 175 g/25 mm and an elongation of 220%.

The adhesive film of Example 1 was further subjected to cutting, whereupon any adhesive burr formation at the sites of cutting could not be confirmed.

Since the 5-μm-thick acrylic resin film (base layer) has a shearing strength of 130 g/25 mm and the 10-μm-thick surface layer (adhesive layer) has a shearing strength of 10 g/25 mm or lower (cf. Table 3), according to the above measurement result, an improvement in shearing strength was confirmed in the adhesive film of Example 1 after lamination of the base layer with the surface layers.

Further, since the 5-μm-thick acrylic resin film (base layer) showed an elongation of 190% and the 10-μm-thick surface layer (adhesive layer) showed an elongation of not lower than 300% (cf. Table 3), it could be confirmed that the elongation percentage of the adhesive film of Example 1 could be lowered to about 220% in spite of lamination of the surface layers showing a high elongation of 300% or more and thus the properties of the base layer exerted influences on the surface layers.

Since the acrylic resin base layer used in the adhesive film of Example 1 does not contain any crosslinking ingredient, it does not cure or harden the surface layer adhesive. Presumably, however, the tackifier resin, acrylic acid (functional group-containing component) and others in the adhesive were covalently bound to the base material in the interface between the surface layers and base layer, or the phenomenon of penetrating low-molecular-weight components such as the tackifier resin into acrylic polymer skeletons of the base material occurred therein, to cause the interface between the surface layers and base layer to be close to each other, disappear or obscure.

As a result, the surface layers were inhibited from non-directional (inclusive of the thickness direction) stretching and, accordingly, no interlayer separation occurred any longer and adhesive burrs are hard to be generated.

(2) Example 2

As shown in Table 6, the adhesive film of Example 2 comprising an acrylic-modified epoxy resin film as the base layer showed a shearing strength of 120 g/25 mm and an elongation of 108%.

The adhesive film of Example 2 was further subjected to cutting, whereupon any adhesive burr formation at the sites of cutting could not be confirmed.

Since the 5-μm-thick acrylic-modified epoxy resin film (base layer) of Example 2 has a shearing strength of 10 g/25 mm and the 10-μm-thick adhesive layer (surface layer) has a shearing strength of 10 g/25 mm or lower (cf. Table 3), the shearing strength of 120 g/25 mm as measured for the adhesive film of Example 2 indicates a dramatic improvement in shearing strength, namely a 12 times increase as compared with the shearing strength of each layer-constituting resin.

In spite of the adhesive film of Example 2 being a product of lamination of the acrylic-modified epoxy resin film (base layer) showing an elongation of 110% with the adhesive (surface layers) showing an elongation of 300% or more, it was confirmed that the elongation of the adhesive film was as low as 108%. Thus, it could be confirmed that the properties of the acrylic-modified epoxy resin film used as the base layer controlled the properties of the adhesive constituting the surface layer, thereby suppress the change in elongation percentage to about 10%.

The marked improvement in shearing strength and the suppression of elongation percentage as thus found with the adhesive film of Example 2 are presumably due to the reason that in the interface region between the surface layers and base layer, epoxy groups contained in the base layer react with the adhesive constituting the surface layer to cause partial crosslinking and thereby the interface of the surface layer is cured or hardened and, further, the phenomenon of penetrating low-molecular-weight molecules in the surface layer into molecular skeletons in the base layer in the interface region occurs and, as a result, gradients in degree of crosslinking, molecular composition and bond structure are formed in this region between the two layers, to cause the interface between the surface layers and base layer to be close to each other, disappear or obscure. Accordingly, the elongation of the surface layers is inhibited by the partial crosslinking, functional group binding and molecular equilibrium, thereby the desired performance characteristics hardly allowing the formation of adhesive burrs can be obtained, without allowing the occurrence of peeling from the base material and without scarifying the adhesive properties.

(3) Example 3

As shown in Table 6, the adhesive film of Example 3 comprising a saturated polyester resin film as the base layer showed a shearing strength of 320 g/25 mm and an elongation of 138%.

The adhesive film of Example 3 was further subjected to cutting, whereupon any adhesive burr formation at the sites of cutting could not be confirmed.

While the 5-μm-thick saturated polyester resin film (base layer) has a shearing strength of 380 g/25 mm, the lamination with the 10-μm-thick adhesive layer (surface layer) having a shearing strength of 10 g/25 mm or lower (cf. Table 3) was confirmed to have caused a decrease in the shearing strength of the adhesive film obtained as compared with the shearing strength of the base layer.

On the other hand, as for the elongation percentage, in spite of the lamination of the saturated polyester resin film (base layer) showing an elongation of 150% with the adhesive (surface layers) showing an elongation of 300% or more, the adhesive film showed an elongation of 138%. Thus, it is presumable that the properties of the saturated polyester resin film used as the base layer exerted influences on the properties of the surface layer-constituting adhesive, thereby cause a decrease in elongation percentage.

In the adhesive film of Example 3, the base layer was formed of the saturated polyester type resin and the surface layers were formed of the acrylic resin-based adhesive and thus both the layers were constituted of different materials, however, the elongation percentage decreased and the formation of adhesive burrs was inhibited, as mentioned above. This fact in Example 3 is presumably due to the use of the non-directional film showing a shearing strength of 380 g/25 mm as the base layer.

The mechanisms are presumably as follows. Thus, as a result of the use, as the base layer, of the film satisfying the requirement that the lengthwise and widthwise shearing strengths should be 2000 g/25 mm or lower, the combination of the shearing strengths of the base layer and surface layers fell within the range such that those shearing strengths would not markedly deviate from each other; at the same time, the use, as the base layer, of an non-directional one inhibited those changes in rupturing behavior which would be otherwise caused in relation to molecular orientation as in the case of adhesive films in which the conventional biaxially stretched film is used as the base layer; and, the non-directional base layer, in harmony with the surface layers, which are also non-directional, inhibited the surface layers from peeling from the base layer.

Thus, it could be confirmed that even when the base layer and surface layers are not common in constituents, for instance, adhesive films which have cuttability suitable for cutting or the like and can inhibit the formation of adhesive burrs or the like can be obtained by selecting the shearing strength of the base layer within the specified range and employing a non-directional one as the base layer.

(4) Comparative Example

The adhesive film of Comparative Example in which the biaxially stretched PET film was used as the base layer showed a shearing strength of 360 g/25 mm and an elongation of 146%. It was thus confirmed that the shearing strength and elongation percentage thereof were relatively close to the values found with the above-mentioned adhesive film of Example 3.

However, when the adhesive film of Comparative Example was subjected to cutting, the formation of adhesive burrs was confirmed at the sites of cutting.

While the 4.5-μm-thick biaxially stretched PET film has a shearing strength of 1800 g/25 mm, the adhesive film derived from the PET film by application of the adhesive unexpectedly showed a shearing strength reduced to 360 g/25 mm; such result is considered as a result of prevention of stress diffusion in the base layer by the wet adhesion effect of the adhesive in the surface layers but such a decrease in shearing strength as mentioned above cannot be considered as a result of disappearance or obscuring of the interfaces between the surface layers and base layer as resulting from the formation of gradients in degree of crosslinking and molecular composition in the interface regions neighboring the base layer. This is evident from the fact that peeling occurred between the base layer and surface layers and adhesive burrs were formed on the occasion of cutting of the adhesive film of the Comparative Example, and such peeling would have never occurred if the interfaces between both the layers had been close to each other, disappeared or obscured.

In the case of the adhesive film of the Comparative Example, in which the biaxially stretched film stretched in the lengthwise and widthwise directions was used as the base layer, the biaxially stretched film to serve as the base layer has molecules oriented in the lengthwise and widthwise directions and the rupturing behaviors thereof in oblique directions are influenced by oriented molecules, hence unstable. Such rupturing behavior in the thickness direction is also influenced by oriented molecules, as mentioned above. Therefore, the base layer is not compatible with the non-directional surface layers, so that such adhesive film is not suited for use in those cases where it is cut to form a curved line for application to press-finished products having a plurality of curves such as bodies of cellular phones or the like, or in those cases where it is subjected to punching for vent hole formation by drilling on a lathe or the like, since such film allows more frequent burr formation in those cases.

2. Test Example 2 (Measurements of Changes in Shearing Strength and Elongation Percentage as Resulting from Changes in Base Layer and Surface Layer Thicknesses)

[Test Methods]

In Examples, the acrylic resin film or modified acrylic-epoxy resin film shown in Table 3 was used as the base layer, and adhesive films were produced by applying the acrylic adhesive shown in Table 3 as an adhesive onto each of the side of that base layer to each thickness (solid matter thickness) specified in the table given below and the changes in shearing strength and elongation percentage as resulting from the changes in surface layer thicknesses were measured.

In Comparative Examples, adhesive films produced by using two of the biaxially stretched PET films shown in Table 3 each as the base layer were subjected to measurements; the other conditions were the same as in the above-mentioned Examples.

TABLE 7

Changes in shearing strength and elongation percentage as resulting from changes in surface layer thickness

| | | Examples | | | |
|---|---|---|---|---|---|
| | adhesive layer thickness (μm) | Acrylic films | | Acrylic-modified epoxy films | |
| Base layer thickness (μm) | One side (both sides) | Shearing strength (g/25 mm) | Elongation (%) | Shearing strength (g/25 mm) | Elongation (%) |
| 5 | 10 (20) | 175 | 220 | 120 | 108 |
| 10 | 10 (20) | 180 | 230 | 110 | 111 |
| 10 | 20 (40) | 180 | 227 | 115 | 113 |

TABLE 7-continued

Changes in shearing strength and elongation percentage as resulting from changes in surface layer thickness

| | | | | | |
|---|---|---|---|---|---|
| 10 | 30 (60) | 185 | 224 | 110 | 114 |
| 10 | 40 (80) | 220 | 230 | 130 | 118 |

Comparative Example

| Base layer thickness (μm) | adhesive thickness (μm) One side (both sides) | Biaxially stretched PET film (thickness 4.5 μm) Shearing strength (g/25 mm) | Elongation (%) | Biaxially stretched PET film (thickness 12 μm) Shearing strength (g/25 mm) | Elongation (%) |
|---|---|---|---|---|---|
| 5 | 10 (20) | 380 | 142 | 1180 | 146 |
| 10 | 10 (20) | 385 | 144 | 1060 | 143 |
| 10 | 20 (40) | 385 | 142 | 1040 | 146 |
| 10 | 30 (60) | 385 | 144 | 1060 | 147 |
| 10 | 40 (80) | 390 | 144 | 1050 | 145 |

[Test Results and Consideration Therefor]

The shearing strength values measured with the adhesive films of the Examples in which a non-directional base layer was used were relatively small, namely about 100 to 200 g/25 mm, and the elongation percentages were within the range of 100% to 250%. These measured values indicate that, for all the surface layer thicknesses employed, the adhesive films of the Examples are readily cuttable in spite of their being stretchable. In fact, no adhesive burr formation could be confirmed upon cutting of the adhesive films shown in Table 7.

On the other hand, in the adhesive films of the Comparative Examples using biaxially stretched films as the base layer as shown in Table 7, shearing strengths of the base layer having the thickness of 4.5 μm, 12 μm and 25 μm respectively is as high as 1800 g to 4000 g/25 mm, however the shearing force is drastically decreased to 380 g to 1060 g/25 mm after the application adhesive application to form the surface layer. This resulting fact is caused because diffusion of tensile stress is inhibited by the adhesive as mentioned already hereinabove, and the decreases in shearing strength do not contribute toward inhibition of adhesive burr formation.

Observation of the sites of the start of rupture on the occasion of breaking the adhesive films of the Comparative Examples, in which either of the biaxially stretched PET films was used as the base layer, at a pulling rate of 100 mm/min with having damaged the end faces thereof revealed a distinct lamellar disjunction between the site of the start of rupture of the biaxially stretched film base layer and the site of the start of rupture of the adhesive layer. Presumably, this disjunction makes the adhesive burr formation problem severe; namely, the surface layer forms burrs and, further, a burr-forming portion of the adhesive in the surface layer joins to another portion of the adhesive and thus gets larger.

Based on the above results, it was conformed that not only the employment of the specific shearing strength value range but also the employment of non-directional base layers is effective in inhibiting the formation of adhesive burrs.

The adhesive films 1, 1' according to the present invention as described hereinabove can be used as adhesive films by themselves or for application or lamination onto other support members or the like for use in various adhesive products.

According to the constitutions described above, the adhesive films 1, 1' have good cuttability, so that when they are subjected to shearing process such as punching or perforating, the surface layer 12 is prevented from being peeled off and drawn from the base layer 11 to form adhesive burrs. The adhesive films also suited for submission to slitting, for instance.

Further, it is possible to obtain adhesive films showing good workability, without causing problems such as defection of a product due to adhesive burr or sticking of the adhesive burrs to cutting dice, drills or like tools.

Therefore, the adhesive films 1, 1' according to the present invention are excellent in line processability and can be suitably subjected to continuous processing to give the desired products efficiently.

In particular, those adhesive films 1, 1' in which the base layer 11 and the surface layer 12 show a shearing strength ratio and a gel fraction ratio and glass transition points (Tg) within the respective ranges given above can securely attain both adhesive properties at ordinary temperature or low temperatures and shear processability.

Those adhesive films 1, 1' which have a gradient resulting from crosslinking due to chemical equilibrium in the interface between the base layer 11 and the surface layer 12 no longer show any distinct interface between the base layer 11 and surface layer 12, hence hardly allow the occurrence of interlayer peeling; on the occasion of shear processing, the surface layer 12 is integrally cut, perforated or otherwise processed together with the base layer 11 and, thus, the occurrence of adhesive burrs and the like can be properly inhibited.

In the adhesive films 1, 1' having such a gradient described above, the interfacial phase between the base layer 11 and surface layer 12 presumably becomes a crosslinked gradient layer or stabilized phase in chemical bonding as a result of uncrosslinked component of isocyanate, epoxy, melamine, metal which is a crosslinking agent contained in the base layer 11 or surface layer 12 causing crosslinking or chemical bonding to one of the surface layer under chemical equilibrium. Even in the case where the main components or partial components of the base layer 11 and surface layer 12 are of the same type, this phenomenon is produced in the same manner provided that one of the layers has a resin composition containing a functional group.

Thus, in appearance, the adhesive films 1, 1' are baseless ones, however, they are excellent in cuttability, hardly allow the formation of adhesive burrs even in punching or perforating and further are excellent in processability in slitting, whereas the conventional baseless adhesive films can never realize such performance characteristics.

In the adhesive films 1, 1' according to the present invention having the surface layers 12 on both sides thereof and being constituted as a double-faced adhesive film, if the surface layers 12, 12 formed on the each of the side of the films are made of different materials, the combination of materials can be made more suitable taking into consideration the compatibility with the adherends as well and, if the surface layers 12 on both sides are changed in adhesive power, different levels of adhesive power on the front and back sides can be combined according to the intended use of the films and other factors.

Furthermore, there is no significant difference between the elongation percentage of the base layer 11 and the elongation percentage of the surface layer 12, thereby it has become possible to provide adhesive films 1, 1' excellent in affinity and stress relaxation characteristics in the interface between both the layers.

Thus the broadest claims that follow are not directed to a machine that is configured in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described;

What is claimed is:

1. An adhesive film characterized in that it comprises a support member and an adhesive layer laminated on at least one side of the support member and the adhesive layer has a laminate structure comprising a pre-polymerized base layer made of a resin-based adhesive with glass transition point (Tg) of 5° C. to 60° C. made of acrylic-modified epoxy resin containing epoxy groups and laminated on the surface of the support member and a surface layer formed by laminating a resin-based adhesive with glass transition point (Tg) of −40° C. to −10° C. of acrylic resins on the pre-polymerized base layer, an interface region being present between the surface layer and the base layer, wherein the base layer is non-directional and has lengthwise and widthwise shearing strengths of 10 g to 380 g [200 mm/min, width 25 mm] in the thickness range of 5 μm to 30 μm, and the base layer has a shearing strength of 1.5 to 38 times the shearing strength of the surface layer, and in the interface region between the surface layer and the base layer, a partial crosslinking is caused by reaction of adhesive constituting the surface layer and the epoxy group contained in the base layer.

2. The adhesive film according to claim 1, wherein crosslinking occurs on an interface between the base layer and the surface layer, thereby causing the interface to disappear or be rendered indistinct.

3. The adhesive film according to claim 1, wherein 20% to 100% of the respective constituents of the base layer and the surface layer are constituted of the same monomer or polymer compositions except for the differences in molecular weight and in intermolecular crosslinking agent species.

4. The adhesive film according to claim 1, wherein the resin constituting the base layer is higher in molecular weight than the resin constituting the surface layer.

5. The adhesive film according to claim 1, wherein the resin constituting the base layer is higher in degree of crosslinking as compared with the resin forming the surface layer.

6. The adhesive film according to claim 1, wherein the surface layer has a thickness of 0.1 μm to 50 μm and the base layer has a thickness of 5 μm to 30 μm.

7. The adhesive film according to claim 1, wherein the elongation percentage of the surface layer is 20 to 500%, and the elongation percentage of the base layer is 0 to 300%.

8. The adhesive film according to claim 1, wherein the support member comprises an imide resin film.

9. The adhesive film according to claim 1, wherein the surface layer has a gel fraction of 0% to 80%, the base layer has a gel fraction of 30% to 100% and the ratio in gel fraction between the base layer and the surface layer is 80 or less relative to 100 of the base layer.

10. The adhesive film according to claim 1, wherein the shearing strength of the surface layer is 10 g [200 mm/min, width 25 mm] or less in the thickness range of 0.1 μm to 150 μm.

11. The adhesive film according to claim 1, wherein the adhesive layer is formed on each of the side of the support member.

12. The adhesive film according to claim 11, wherein the surface layer on one side thereof and the surface layer on the other side thereof are formed of different adhesives.

13. The adhesive film according to claim 11, wherein the surface layer on one side thereof and the surface layer on the other side thereof are formed of adhesives differing in adhesive power.

14. The adhesive film according to claim 11, wherein the elongation percentage of the surface layer is 20 to 500%, and the elongation percentage of the base layer is 0 to 300%.

15. The adhesive film according to claim 11, wherein the support member comprises an imide resin film.

* * * * *

UNITED STATES PATENT AND TRADEMARK OFFICE
CERTIFICATE OF CORRECTION

| | | |
|---|---|---|
| PATENT NO. | : 9,765,242 B2 | Page 1 of 1 |
| APPLICATION NO. | : 12/086108 | |
| DATED | : September 19, 2017 | |
| INVENTOR(S) | : Shokichi Hamano | |

It is certified that error appears in the above-identified patent and that said Letters Patent is hereby corrected as shown below:

On the Title Page

Item (75) titled Inventor, please insert -- -shi-- after Tokorozawa

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*